(12) United States Patent
Reinhardt et al.

(10) Patent No.: US 6,367,812 B1
(45) Date of Patent: Apr. 9, 2002

(54) RADIAL SHAFT-SEALING RING AND PROCESS FOR MANUFACTURING THE SAME

(75) Inventors: Hans Reinhardt, Weinheim; Rolf Vogt, Oftersheim, both of (DE)

(73) Assignee: Carl Freudengerg, Weinheim (DE)

( * ) Notice: Subject to any disclaimer, the term of this patent is extended or adjusted under 35 U.S.C. 154(b) by 708 days.

(21) Appl. No.: 08/893,906

(22) Filed: Jul. 11, 1997

Related U.S. Application Data

(63) Continuation of application No. 08/677,026, filed on Jul. 8, 1996, now abandoned.

(30) Foreign Application Priority Data

Jul. 10, 1995 (DE) .......................................... 195 25 054

(51) Int. Cl.⁷ ................................................ F16J 15/32
(52) U.S. Cl. ...................................... 277/572; 277/584
(58) Field of Search ................................ 277/309, 316, 277/549, 572, 575, 582, 584; 264/130, 135, 268

(56) References Cited

U.S. PATENT DOCUMENTS

| | | | | |
|---|---|---|---|---|
| 1,519,547 A | * | 12/1924 | Marquette | 264/130 |
| 2,128,534 A | * | 8/1938 | Howald | 264/130 |
| 3,423,503 A | * | 1/1969 | York | 272647/130 |
| 4,159,298 A | * | 6/1979 | Bainard | 277/575 |
| 4,300,778 A | * | 11/1981 | Gagne | 277/188 A |
| 4,427,206 A | * | 1/1984 | Sugiyama | 277/572 |
| 4,491,332 A | * | 1/1985 | Zumbusch | 277/575 |
| 4,747,605 A | * | 5/1988 | Antonini | 277/188 A |
| 5,106,565 A | * | 4/1992 | Saitoh | 277/575 |
| 5,183,271 A | * | 2/1993 | Wada et al. | 277/575 |
| 5,326,112 A | * | 7/1994 | Paykin | 277/575 |
| 5,464,586 A | * | 11/1995 | Wagner | 264/130 |

\* cited by examiner

*Primary Examiner*—Daniel G. DePumpo
(74) *Attorney, Agent, or Firm*—Milde, Hoffberg & Macklin, LLP

(57) ABSTRACT

A radial shaft-sealing ring with a sealing (1) ring made of a polymer with sealing properties, rubber for example. The sealing ring has at least one lip (2) that rests on the shaft (4) against a backing ring (3) at the side not subject to pressure. The lip is permanently fastened to a reinforcing ring (5). The cross-section of the reinforcing ring in accordance with the invention is L shaped with at least one wall that extends radially inward and rests against and partly covers the backing ring.

1 Claim, 1 Drawing Sheet

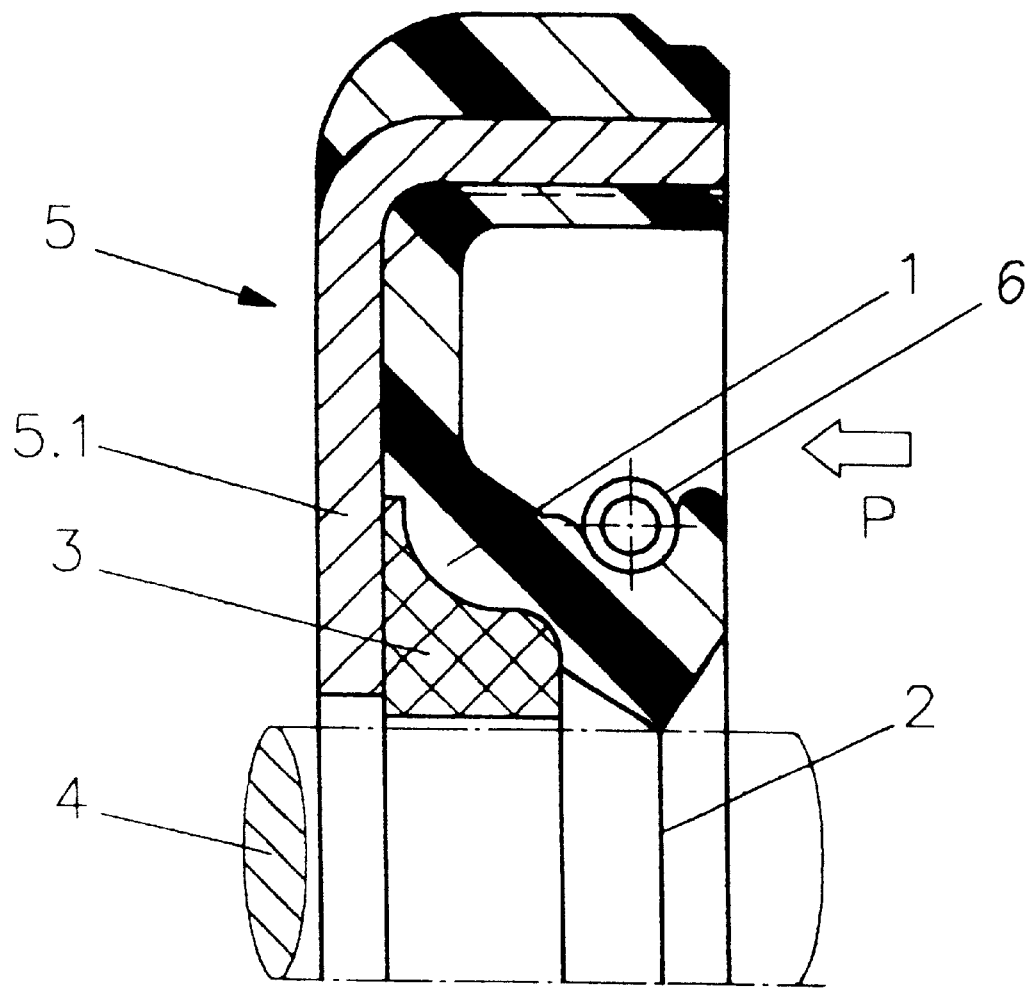

RADIAL SHAFT-SEALING RING AND PROCESS FOR MANUFACTURING THE SAME

This application is a continuation of application Ser. No. 08/677,026, filed Jul. 8, 1996, now abandoned.

BACKGROUND OF THE INVENTION

The present invention concerns both a radial shaft-sealing ring and a process for manufacturing such a ring. The radial shaft-sealing ring has a sealing ring made of a polymer with sealing properties, rubber for example, whereby the sealing ring has at least one lip that rests on the shaft against a backing ring at the side not subject to pressure, and the lip is permanently fastened to a reinforcing ring.

A radial shaft-sealing ring of this type is known from the German Patent Publication No. OS 4,317,489. It is complicated to manufacture and its operating properties are not very satisfactory.

SUMMARY OF THE INVENTION

One object of the present invention is a radial shaft-sealing ring of the same type that will be easier to manufacture and have definitely better operating properties.

This object is attained in accordance with the present invention in such a radial shaft-sealing ring by providing a sealing ring wherein the cross-section of the reinforcing ring is L-shaped with at least one wall that extends radially inward and rests against, and partly covers the backing ring.

The radial shaft-sealing ring in accordance with the present invention includes a sealing ring made of a polymer with sealing properties, rubber for example. The sealing ring has at least one lip. The lip rests on the shaft against a backing ring at the side not subject to pressure. The lip is also permanently fastened to a reinforcing ring. The cross-section of the reinforcing ring is L shaped with at least one wall that extends radially inward and rests against and partly covers the backing ring. The reinforcing ring supports the backing ring axially, preventing axial motion at high pressure and ideally positioning the sealing lip. A radial shaft-sealing ring in accordance with the present invention can accordingly easily accommodate pressures of up to 200 bars on the part of the fluid being sealed out against shafts up to 80 mm in diameter. The wall recess that accommodates the reinforcing ring while the shaft is in operation can be similar to that employed with conventional radial shaft-sealing rings. The lip and backing ring on the other hand can be exceptionally well directly positioned and supported as desired by the manufacturer alone by components of the reinforcing ring. Manufacturing imprecision in the recess tolerances, which are usually established by the user, will have no effect on operation.

The radial shaft-sealing ring disclosed in the German Patent Publication No. OS 4,317,489 is manufactured by a process wherein a reinforcing ring is inserted in a tool cavity, which is then filled with a raw sealing material in the form of a liquid or paste. The sealing material is then solidified, bonded to the reinforcement, and the radial shaft sealing ring is removed from the cavity. The backing ring is produced separately and forced into a groove in the lip in a subsequent step. This procedure is inconvenient and expensive.

Another object of the present invention is accordingly to considerably simplify the manufacture of this type of radial shaft-sealing ring.

This object is attained in accordance with the present invention in a process of the aforesaid type wherein the backing ring is introduced into the tool cavity along with the reinforcing ring and positioned against the radial inward wall on the reinforcing ring, subsequent to which the cavity is filled with a polymeric material, finishing the sealing ring. Directly molding a backing ring already resting against an ideally positioned reinforcing ring into the overall radial shaft-sealing ring automatically compensates for any lack of precision in the manufacturing tolerances of the two components. The resulting radial shaft sealing ring will have optimal dimensional stability, a characteristic of particular advantage with respect to eventual operating properties.

Operating properties can be improved even further if the backing ring, before being inserted into the tool cavity, is provided with an anti-adhesive that prevents it from attaching to the polymer that the sealing ring is made of. Such an anti-adhesive will make it easier for it to move in relation to the sealing ring. The anti-adhesive can be added to the polymer the backing ring is made of. This procedure turns out to be particularly easy. On the other hand it is possible to add anti-adhesive as well (or only to) the surface of the already manufactured backing ring, during an immersion or spraying stage, for example.

One embodiment of the present invention will now be specified by way of example with reference to the accompanying drawing.

BRIEF DESCRIPTION OF THE DRAWINGS

The sole FIGURE is a partial section of the preferred embodiment of the invention.

DESCRIPTION OF THE PREFERRED EMBODIMENTS

The radial shaft-sealing ring is provided with a sealing ring 1. Ring 1 is made of a polymer with sealing properties, rubber for example. It has a lip 2 that rests by way of a backing ring 3, on the side not subject to pressure, against the shaft 4 that is being sealed off. The sealing ring is permanently fastened to a reinforcing ring 5 of deep-drawn sheet steel. The cross-section of reinforcing ring 5 is L-shaped, and one wall 5.1 extends radially inward, overlapping and resting directly against backing ring 3.

Backing ring 3 is made of a rigid plastic. It is dimensioned to loosely enclose shaft 4 while the latter is in operation. The resulting play is slight enough to rule out any risk of pressure on the sealing material in the radial gap between backing ring 3 and shaft 4 even at pressures up to 200 bars in the direction represented by the arrow.

The surface of backing ring 3 was coated with an anti-adhesive oil prior to the molding and vulcanization of sealing ring 1. It will accordingly not adhere to the sealing ring when the sealing ring is vulcanized to the reinforcing ring and will be able to move relative to the sealing ring. The relative motion is sufficient to keep lip 2 in alignment during radial displacement of the shaft. Lip 2 is adjusted to the surface of shaft 4 by an annular helical spring 6 of steel.

A dimensionally stable radial shaft-sealing ring in accordance with the present invention is particularly easy to manufacture. It is also distinguished by particularly satisfactory operating properties at pressures up to 200 bars.

There has thus been shown and described a novel radial shaft-sealing ring and process for manufacturing the same which fulfills all the objects and advantages sought therefor. Many changes, modifications, variations and other uses and applications of the subject invention will, however, become apparent to those skilled in the art after considering the specification and the accompanying drawings which disclose the preferred embodiments thereof. All such changes, modifications, variations and other uses and applications which do not department from the spirit and scope of the invention are deemed to be covered by the invention which is to be limited only by the claims which follow.

What is claimed is:

1. In a process for manufacturing a radial shaft-sealing ring comprising a sealing ring made of a polymeric material with sealing properties, whereby the sealing ring has at least one lip that rests on the shaft to be sealed and rests against a backing ring at the side not subject to pressure, whereby the sealing ring is permanently fastened to a reinforcing ring having an angle-shaped profile with a radially inward extending leg that at least partially overlaps and rests directly against the backing ring, the process including the steps of inserting both the reinforcing ring and the backing ring in a tool cavity, filling the remaining space in the tool cavity with a raw polymeric sealing material in the form of a liquid or paste, allowing the polymeric sealing material to solidify and bond to the reinforcing ring and removing the radial shaft-sealing ring from the cavity;

the improvement comprising the step of incorporating an anti-adhesive additive in the hard plastic material of the backing ring to prevent the backing ring from attaching to the polymeric material that the sealing ring is made of.

* * * * *